(12) United States Patent
Chen

(10) Patent No.: US 6,714,409 B2
(45) Date of Patent: Mar. 30, 2004

(54) DRIVE BRACKET ASSEMBLY FOR COMPUTER ENCLOSURE

(75) Inventor: Yun-Lung Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/177,166

(22) Filed: Jun. 20, 2002

(65) Prior Publication Data
US 2003/0202322 A1 Oct. 30, 2003

(30) Foreign Application Priority Data
Apr. 25, 2002 (TW) .......................................... 91205686

(51) Int. Cl.[7] ................................................ G06F 1/16
(52) U.S. Cl. .................... 361/685; 361/726; 312/223.2; 360/137
(58) Field of Search ................................ 361/684–687, 361/724–727; 369/75.1; 312/223.1–223.6; 174/52.1, 66; 360/97.02, 137

(56) References Cited
U.S. PATENT DOCUMENTS
6,483,710 B1 * 11/2002 Reasoner et al. ........... 361/726

6,590,848 B1 * 7/2003 Chen ........................ 369/75.1
2003/0090869 * 5/2003 Liu et al. .................... 361/685

* cited by examiner

Primary Examiner—Hung Van Duong
(74) Attorney, Agent, or Firm—Wei Te Chung

(57) ABSTRACT

A drive bracket assembly includes a first bracket (30), a connecting board (60), and a second bracket (70). The first bracket includes a bottom wall (32) and a sidewall (34). An arcuate railway is downwardly formed at the bottom wall. Two protrusions (46) downwardly protrude from the bottom wall. An L-shaped hook (48) depends from a junction of the bottom wall and the sidewall. An arcuate guideway (62) is upwardly formed at the connecting board. Two projections (67) are upwardly formed from an elastic arm (66) of the connecting board, for snappingly engaging with the protrusions. A latch (65) is formed at the connecting board, for engaging with the hook. The connecting board is attached on the second bracket. The second bracket can be slidably moved into or out from the computer enclosure, by sliding the guideway of the connecting board along the railway of the first bracket.

14 Claims, 4 Drawing Sheets

DRIVE BRACKET ASSEMBLY FOR COMPUTER ENCLOSURE

BACKGROUND OF THE INVENTION

1. Field of the Invention

The present invention relates to computer enclosures, and more particularly to drive bracket assemblies for computer enclosures.

2. Description of the Related Art

A conventional computer enclosure comprises at least one drive bracket for receiving a disk drive such as a hard disk drive (HDD), floppy disk drive (FDD), or CD-ROM drive. The bracket provides a means of connection to the disk drive as well as a means of connection to the enclosure. Conventionally, a disk drive is secured to the bracket with screws. The combined bracket and disk drive is then connected to the enclosure with screws or other suitable fasteners. The primary disadvantage of conventional enclosures is that screws must be used to secure the disk drive in the enclosure. Insertion and removal of screws is time consuming and cumbersome. In particular, a typical enclosure provides limited workspace and accessibility for manipulating the screws. Furthermore, a typical enclosure with disk drive is configured such that the disk drive must first be removed to gain access to other components within the enclosure. It is inconvenient and laborious to have to unscrew and remove the disk drive when maintenance or replacement of other components within the enclosure is required.

SUMMARY OF THE INVENTION

Accordingly, an object of the present invention is to provide a drive bracket assembly which allows a disk drive to be conveniently attached to or detached from a computer enclosure.

Another object of the present invention is to provide a drive bracket assembly which allows a disk drive to be rotatably moved into and out from a computer enclosure.

To achieve the above objects, a drive bracket assembly in accordance with the present invention comprises a first bracket, a connecting board and a second bracket. The first bracket comprises a bottom wall and a sidewall. An arcuate railway is downwardly formed at a middle portion of the bottom wall. A pair of protrusions downwardly protrudes from a rear portion of the bottom wall. An L-shaped hook depends from a junction of the bottom wall and the sidewall. An arcuate guideway is upwardly formed at a middle portion of the connecting board, corresponding to the railway of the first bracket. An elastic arm is upwardly formed at a rear end portion of the connecting board. A pair of projections is upwardly formed from the elastic arm, for snappingly engaging with the protrusions of the bottom wall. A latch is formed at the connecting board, for engaging with the hook of the first bracket. The connecting board is attached on the second bracket with rivets. The second bracket can be slidably moved into or out from the computer enclosure, by sliding the guideway of the connecting board along the railway of the first bracket.

Other objects, advantages and novel features of the present invention will be drawn from the following detailed description of a preferred embodiment of the present invention with attached drawings, in which:

DESCRIPTION OF THE PREFERRED EMBODIMENT

Figure 1:
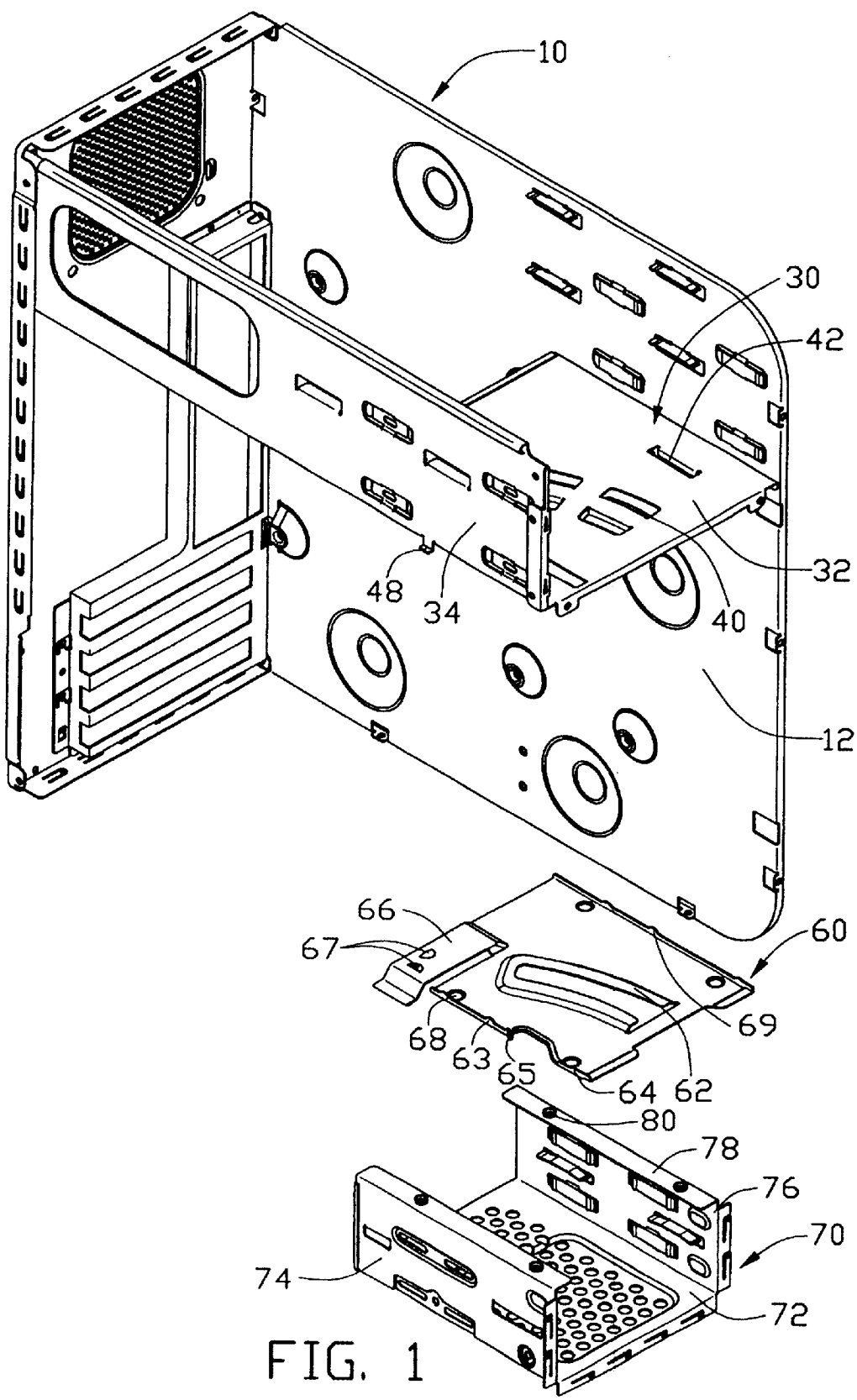
FIG. 1 is an exploded isometric view of a computer enclosure incorporating a drive bracket assembly in accordance with a preferred embodiment of the present invention.

Referring to FIG. 1, a drive bracket assembly of the present invention comprises a first bracket 30, a connecting board 60 and a second bracket 70. The drive bracket assembly is attached to a body 10 of a computer enclosure.

Figure 2:
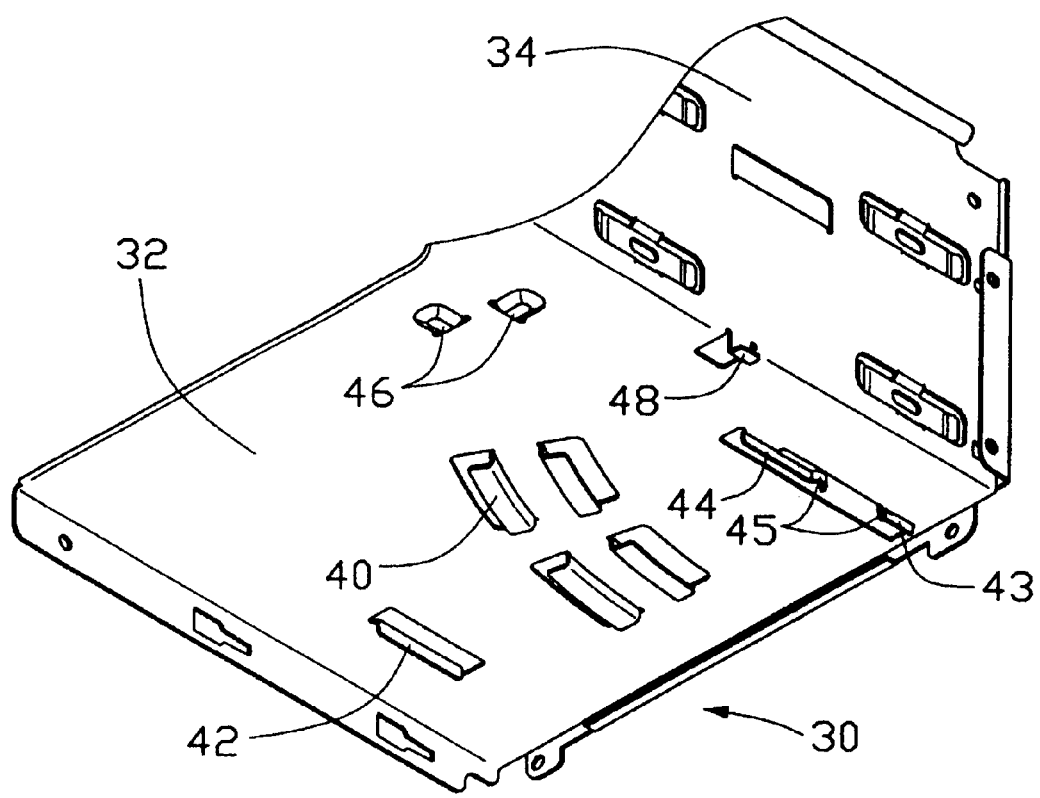
FIG. 2 is a partial isometric view of a first bracket of the drive bracket assembly of FIG. 1, but viewed from another aspect.

Referring also to FIG. 2, the body 10 comprises a side panel 12. The first bracket 30 is provided for housing a disk drive such as a hard disk drive (HDD) (not shown). The first bracket 30 is fixedly mounted in the body 10. The first bracket 30 comprises a bottom wall 32, and a sidewall 34 that is parallel to and opposes the side panel 12 of the body 10. An arcuate railway is downwardly formed at a middle portion of the bottom wall 32. The railway comprises a plurality of pairs of symmetrically opposing bent plates 40. Each bent plate 40 has a generally L-shaped profile. Each pair of bent plates 40 extends perpendicularly downwardly from the bottom wall 32, and then perpendicularly in respective opposite horizontal directions. In the preferred embodiment, there are two pairs of bent plates 40. Each pair of bent plates 40 is in arcuate alignment with the other pair of bent plates 40, to cooperatively form the arcuate railway. A first bent flange 42 depends perpendicularly from the bottom wall 32 near the side panel 12 of the body 10. A second bent flange 43 and a third bent flange 44 depend perpendicularly from the bottom wall 32 near the sidewall 34. The second and third bent flanges 43, 44 are spaced apart and aligned with each other. A pair of symmetrically opposing curved end portions 45 is respectively formed at opposing ends of the second and third bent flanges 43, 44. A pair of protrusions 46 is downwardly formed from a rear portion of the bottom wall 32. The protrusions 46 are oriented generally perpendicular to each other. An L-shaped hook 48 depends from a junction of the bottom wall 32 and the sidewall 34.

The connecting board 60 is formed from a sheet of metal such as steel. An arcuate guideway 62 is upwardly formed at a middle portion of the connecting board 60, corresponding to the railway of the first bracket 30. The guideway 62 comprises a front open end and a rear closed end. A fourth bent flange 63 and a fifth bent flange 64 are bent perpendicularly upwardly from a side edge of the connecting board 60 that corresponds to the sidewall 34 of the first bracket 30. The fourth and fifth bent flanges 63, 64 are spaced apart from each other. A latch 65 is formed at an end portion of the fourth bent flange 63 that is nearest the fifth bent flange 64. A sixth bent flange 69 is bent perpendicularly upwardly from an opposite side edge of the connecting board 60. A first hole 68 is defined in each of four corners of the connecting board 60. An elastic arm 66 is upwardly formed at a rear end portion of the connecting board 60. A pair of projections 67 is upwardly formed from the elastic arm 66, for snappingly engaging with the protrusions 46 of the bottom wall 32 of the first bracket 30. The projections 67 are oriented generally perpendicular to each other.

The second bracket 70 is provided for housing a disk drive such as an HDD (not shown). The second bracket 70 comprises a bottom wall 72, and opposite sidewalls 74, 76. A pair of seventh bent flanges 78 extends perpendicularly inwardly from top edges of the sidewalls 74, 76 respectively. A pair of spaced second holes 80 is defined in each of the seventh bent flanges 78. The second holes 80 correspond to the first holes 68 of the connecting board 60.

Figure 3:
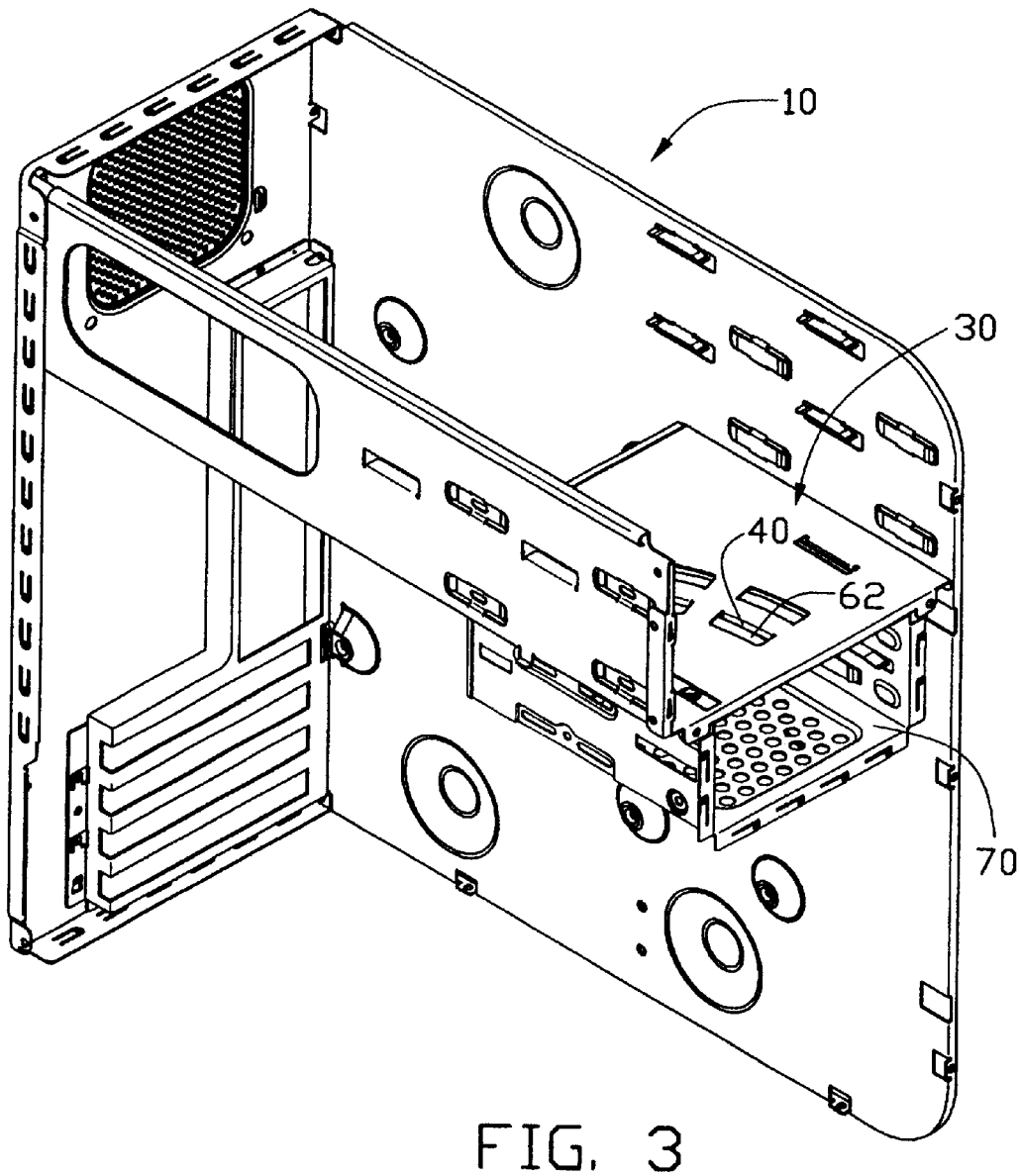
FIG. 3 is an assembled view of FIG. 1, showing a second bracket of the drive bracket assembly fully rotated to be locked within a body of the enclosure.

Referring to FIG. 3, in assembly of the computer enclosure, the connecting board 60 is placed on the second bracket 70. A plurality of rivets (not shown) is extended through the first holes 68 and the second holes 80 to secure the connecting board 60 and the second bracket 70 together. The guideway 62 of the connecting board 60 is slidingly engaged with a rearmost pair of the bent plates 40 of the first bracket 30. The connecting board 60 is slid along the bent plates 40 until the fifth bent flange 64 of the connecting board 60 is located between the second and third bent flanges 43, 44 of the first bracket 30. The end portion 45 of the third bent flange 44 contacts the fifth bent flange 64. The connecting board 60 is further slid along the bent plates 40, with the fifth bent flange 64 sliding along the end portion 45. The latch 65 of the connecting board 60 passes by an inside of the hook 48 of the first bracket 30. When the closed end of the guideway 62 reaches the bent plates 40, the fourth and fifth bent flanges 63, 64 of the connecting board 60 respectively engage with the third and second bent flanges 44, 43 of the first bracket 30. The sixth bent flange 69 of the connecting board 60 engages with the first bent flange 42 of the first bracket 30. The fifth bent flange 64 is disposed between the end portions 45 of the second and third bent flanges 43, 44, and the projections 67 of the connecting board 60 snappingly engage with the protrusions 46 of the first bracket 30. The second bracket 70 is suspended below the first bracket 30, with the guideway 62 fully receiving the bent plates 40. Locking of the second bracket 70 to the first bracket 30 is thus completed. In this state, the second bracket 70 is located in a first position. The second bracket 70 is prevented from moving by: a) the protrusions 46 engaging with the projections 67; b) the first bent flange 42 engaging with the sixth bent flange 69; c) the third bent flange 44 engaging with fourth bent flange 63; and d) the fifth bent flange 64 being disposed between the end portions 45.

Figure 4:
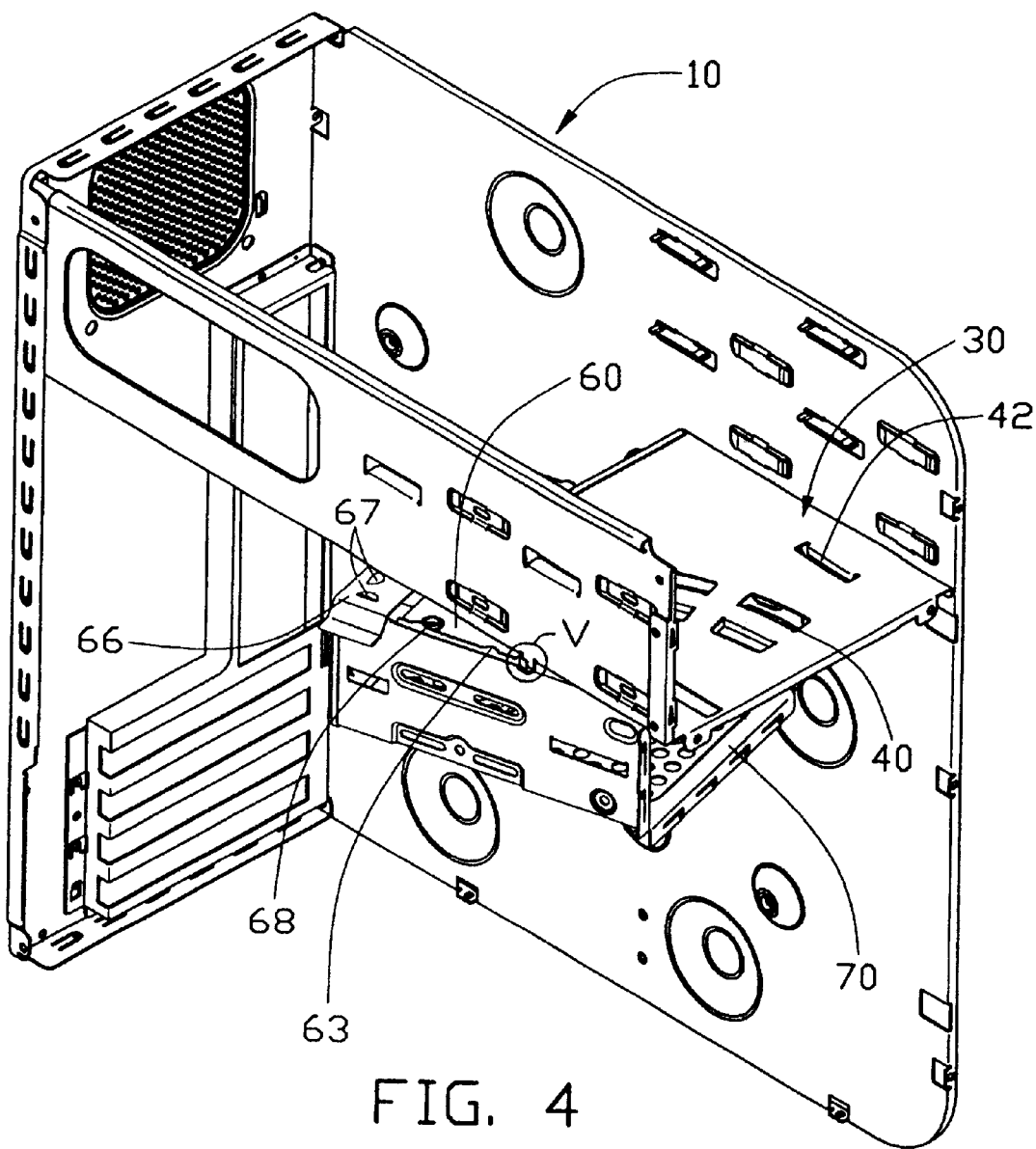
FIG. 4 is similar to FIG. 3, but showing the second bracket rotated out from the body.
Figure 5:
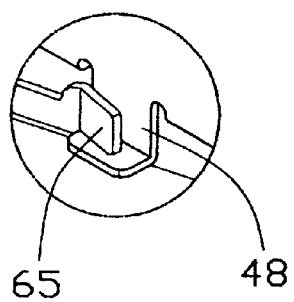
FIG. 5 is an enlarged view of a circled portion V of FIG. 4.

Referring to FIGS. 4 and 5, the second bracket 70 can be easily slid out from inside the body 10. The elastic arm 66 is pressed downwardly to disengage the projections 67 from the protrusions 46. The second bracket 70 is slid out from the body 10, with the latch 65 of the connecting board 60 passing by the inside of the hook 48 of the first bracket 30. Then, the latch 65 is pushed toward the hook 48 until the latch 65 is supported on the hook 48 (see especially FIG. 5). The second bracket 70 is thus suspended outside the body 10. In this state, the second bracket is in a second position. It is then easy to access or remove a disk drive housed inside the second bracket 70, or to maintain other components inside the body 10.

While the present invention has been illustrated by the above description of an embodiment thereof, and while the embodiment has been described in considerable detail, it is not intended to restrict or in any way limit the scope of the appended claims to such detail. Additional advantages and modifications will readily appear to those skilled in the art. Therefore, the present invention is not limited to the specific details and illustrative examples shown and described above.

What is claimed is:

1. A drive bracket assembly for a computer enclosure, the drive bracket assembly comprising:

a first bracket for connecting with the enclosure and adapted for receiving a first disk drive therein, the first bracket comprising a bottom wall and a sidewall, an arcuate railway being arranged at the bottom wall, at least one protrusion protruding from the bottom wall;

a second bracket adapted for receiving a second disk drive therein; and a connecting board secured on the second bracket, the connecting board comprising a guideway slidably engaged with the railway of the first bracket, and an elastic arm, at least one projection projecting from the elastic arm;

wherein when the at least one projection is snappingly engaged with the at least one protrusion, the second bracket is located in a first position attached below the first bracket, and when the at least one projection is disengaged from the at least one protrusion by pressing the elastic arm, the second bracket is releasable from the first bracket to a second open position.

2. The drive bracket assembly as claimed in claim 1, wherein the railway comprises at least one pair of opposing substantially L-shaped bent plates.

3. The drive bracket assembly as claimed in claim 1, wherein the guideway is generally arcuate, and comprises a front open end and a rear closed end.

4. The drive bracket assembly as claimed in claim 1, wherein a plurality of first holes is defined in the connecting board, a pair of seventh flanges is arranged at upper portions of sidewalls of the second bracket, a plurality of second holes is defined in the seventh flanges, and rivets are extended through the first and second holes to secure the connecting board on the second bracket.

5. The drive bracket assembly as claimed in claim 2, wherein a first flange depends from the bottom wall distal from the sidewall, and a second flange and a third flange depend from the bottom wall near the sidewall.

6. The drive bracket assembly as claimed in claim 5, wherein a fourth and a fifth flange extend upwardly from one side of the connecting board, the fourth flange engaging with the third flange and the fifth flange being disposed between the second and third flanges when the second bracket is in the first position, and a sixth flange extends upwardly from an opposite side of the connecting board, the sixth flange engaging with the first flange when the second bracket is in the first position.

7. The drive bracket assembly as claimed in claim 6, wherein a hook is formed at a junction of the bottom wall and the sidewall of the first bracket, and a latch is arranged at an end of the fourth flange of the connecting board, the latch supporting the hook when the second bracket is located in the second position.

8. A drive bracket assembly comprising:

a first bracket for connecting with an enclosure and adapted for receiving a first disk drive therein, the first bracket comprising a bottom wall having an arcuate railway, and a sidewall;

a second bracket adapted for receiving a second disk drive therein;

a connecting board secured on the second bracket and having a guideway slidably engaging with the railway whereby the second bracket is movably attached to the first bracket;

complementary disengagable interengagement means respectively arranged on the first bracket and on the connecting board;

wherein when the interengagement means is in an engaged state, the second bracket is located in a first position securely attached to the first bracket, and when the interengagement means is disengaged, the second bracket is slidable to a second open position.

9. The drive bracket assembly as claimed in claim 8, wherein the complementary disengagable interengagement means comprises at least one protrusion arranged on the bottom wall of the first bracket, and at least one projection arranged on an elastic arm of the connecting board.

10. The drive bracket assembly as claimed in claim 8, further comprising a hook and latch respectively arranged on the first bracket and on the connecting board, wherein when the second bracket is in the second position, the hook supports the latch.

11. The drive bracket assembly as claimed in claim 8, wherein a first flange depends from the bottom wall of the first bracket distal from the sidewall, and a second flange and a third flange depend from the bottom wall near the sidewall.

12. The drive bracket assembly as claimed in claim 9, wherein the complementary disengagable interengagement means comprises a pair of protrusions generally perpendicular to each other, and a pair of projections generally perpendicular to each other.

13. The drive bracket assembly as claimed in claim 10, wherein the hook is generally L-shaped and is arranged at a junction of the bottom wall and the sidewall of the first bracket, and the latch is arranged at one side of the connecting board.

14. The drive bracket assembly as claimed in claim 11, wherein a fourth flange and a fifth flange extend upwardly from one side of the connecting board, the fourth flange engaging with the third flange and the fifth flange being disposed between the second and third flanges when the second bracket is in the first position, and a sixth flange extends upwardly from an opposite side of the connecting board, the sixth flange engaging with the first flange when the second bracket is in the first position.

* * * * *